US 8,273,478 B2

(12) United States Patent
Kim et al.

(10) Patent No.: US 8,273,478 B2
(45) Date of Patent: Sep. 25, 2012

(54) RECHARGEABLE LITHIUM BATTERY

(75) Inventors: Jin-Sung Kim, Suwon-si (KR); Na-Rae Park, Suwon-si (KR); Su-Hee Han, Suwon-si (KR); Jin-Hyunk Lim, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 614 days.

(21) Appl. No.: 12/385,154

(22) Filed: Mar. 31, 2009

(65) Prior Publication Data

US 2010/0159336 A1 Jun. 24, 2010

(30) Foreign Application Priority Data

Dec. 22, 2008 (KR) .................. 10-2008-0131318

(51) Int. Cl.
*H01M 4/58* (2010.01)
(52) U.S. Cl. .............. 429/218.1; 429/222; 429/225; 429/229; 429/231.6; 429/231.8; 429/231.1; 429/231.3; 429/231.2; 429/338; 429/331; 429/332; 429/307; 429/199; 429/200; 252/62.2
(58) Field of Classification Search .......... 429/218.1, 429/222, 225, 229, 231.6, 231.8, 231.1, 231.3, 429/231.2, 338, 331, 332, 307, 199, 200; 252/62.2
See application file for complete search history.

(56) References Cited

U.S. PATENT DOCUMENTS

| 7,078,132 B2 | 7/2006 | Kim et al. | |
|---|---|---|---|
| 7,351,501 B2 | 4/2008 | Jung et al. | |
| 2005/0170253 A1 | 8/2005 | Yoon et al. | |
| 2007/0154810 A1 | 7/2007 | Kim et al. | |
| 2009/0286155 A1* | 11/2009 | Takehara | 429/199 |
| 2011/0091768 A1* | 4/2011 | Ohashi et al. | 429/199 |

FOREIGN PATENT DOCUMENTS

| JP | 2001229966 A | | 8/2001 |
|---|---|---|---|
| JP | 2005-071655 | | 3/2005 |
| JP | 2008-181831 | * | 8/2008 |
| KR | 1020030057321 A | | 7/2003 |
| KR | 1020040065152 A | | 7/2004 |
| KR | 1020050011213 A | | 1/2005 |
| WO | WO 2008/023744 | * | 2/2008 |
| WO | WO 2009/035054 | * | 3/2009 |

OTHER PUBLICATIONS

Korean Office Action issued by Korean Patent Office on Aug. 3, 2011, corresponding to Korean Patent Application No. 10-2008-0131318 and Request for Entry of the Accompanying Office Action attached herewith.
Korean Office Action dated Sep. 29, 2010 issued by the KIPO corresponding to Korean Priority Application No. 10-2008-0131318, together with a Request for Entry.
Idota et al., entitled *Tin-Based Amorphous Oxide: A High-Capacity Lithium-Ion-Storage Material*, Science, vol. 276, pp. 1395-1397, May 30, 1997, (www.sciencemag.org).
Miyamoto et al., entitled *Synthesis of Manganese Dioxide From Manganese Acetate and Ammonium Peroxidodisulfate for Lithium Primary Cells*, Electrochemistry, Dept of Chemical Science and Engineering, Arika National College of Technology, Feb. 8, 2002.
Korean Notice of Allowance issued by Korean Patent Office on Mar. 19, 2012 in connection with Korean Application No. 10-2008-0131318 and Request for Entry attached herewith.

* cited by examiner

*Primary Examiner* — Laura Weiner
(74) *Attorney, Agent, or Firm* — Robert E. Bushnell, Esq.

(57) ABSTRACT

A rechargeable lithium battery includes an electrolyte including an additive such as an ethylene carbonate-based compound represented by Chemical Formula 1 and a silicon-included compound, and a negative electrode including a negative active material including an active element selected from the group consisting of Si, Sn, Ga, Cd, Al, Pb, Zn, Bi, In, Mg, and Ge.

[Chemical Formula 1]

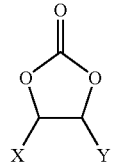

In Chemical formula 1, X and Y are independently selected from the group consisting of hydrogen, a halogen, and a C1 through C5 fluoroalkyl, provided that at least one of X and Y is selected from the group consisting of a halogen and a C1 through C5 fluoroalkyl.
The rechargeable lithium battery has a suppressed volume expansion characteristic due to a high-capacity negative active material, and has excellent reliability and cycle-life characteristics.

11 Claims, 2 Drawing Sheets

RECHARGEABLE LITHIUM BATTERY

CLAIM OF PRIORITY

This application makes reference to, incorporates the same herein, and claims all benefits accruing under 35 U.S.C. §119 from an application for LITHIUM SECONDARY BATTERY earlier filed in the Korean intellectual Property Office on 22 Dec. 2008 and there duly assigned Ser. No. 10-2008-0131318

BACKGROUND OF THE INVENTION

1. Field of the Invention

The present invention relates to a rechargeable lithium battery, and more particularly, to an improved rechargeable lithium battery having excellent reliability and cycle-life characteristics attainable by inhibiting volume expansion caused by high-capacity negative active materials.

2. Description of the Related Art

Batteries include primary batteries which can be used only once and are then disposed of and secondary batteries which can be recharged and used repeatedly. Primary batteries include manganese batteries, alkaline batteries, mercury batteries, silver oxide batteries, and the like. Secondary batteries include lead-acid storage batteries, nickel-metal hydride (Ni—MH) batteries, sealed nickel-cadmium batteries, lithium metal batteries, lithium ion batteries, lithium polymer batteries, lithium-sulfur batteries, and the like.

A lithium battery generally includes a negative electrode and a positive electrode, and a separator disposed between the negative electrode and the positive electrode. The negative electrode provides electrons during a battery discharge, a positive electrode gains electrons provided by the negative electrode during the battery discharge, the separator sandwiched between said positive electrode electrically insulates the negative electrode and the positive electrode. Lithium batteries generally use lithium metal or lithium compounds to form electrodes.

Recently, lithium batteries have been required to have high capacity. Since portable electronic devices are widely used and generally use the lithium batteries as power source, the lithium batteries are required to have lighter weight and better performance in compliance with the current market requirements. Meanwhile, research and development on active materials have been active in these years. Lithium metal has been contemporarily used as a negative active material, however, the lithium metal may form dendrites and thereby may cause a battery short-circuit. Such battery short-circuit may cause an explosion of a battery having the lithium metal.

A carbon-based material instead of the lithium metal is now mostly used as a negative active material. This carbon-based active material used as a negative active material forming a lithium battery may include crystalline carbon such as graphite and artificial graphite, or amorphous carbon such as hard carbon. Even though the amorphous carbon has large capacity, a problem of substantial non-reversibility occurs during charge and discharge. The crystalline carbon representatively includes graphite. The graphite has high capacity because the graphite has a theoretical capacity limit of 372 mAh/g, however, the graphite has severely deteriorated cycle-life. Even though the graphite or carbon-based active material has comparatively high theoretical capacity (a limit of 372 mAh/g), the graphite or carbon-based active material cannot be used for the aforementioned negative electrode of a desirable high-capacity lithium battery because the theoretical capacity of the graphite or carbon-based active material is not higher than 380 mAh/g.

In order to solve this problem, active research focuses on a metal-based or inter-metallic compound which may be used as a negative active material. For example, metals or semi-metals such as aluminum, germanium, silicon, tin, zinc, lead, and the like have been determined as candidates of a negative active material. These materials have high capacity and high energy density. Since they can intercalate and deintercalate more lithium ions than a carbon-based negative active material, they can contribute to a lithium battery with high capacity and high energy density.

For example, pure silicon is known to have a high theoretical capacity of 4017 mAh/g. The pure silicon however has deteriorated cycle characteristics compared with a carbon-based material, therefore, the pure silicon has not yet been successfully used to manufacture of the lithium battery. The reason of failing to use silicon in forming the lithium battery is that, a mineral particle such as silicon or tin may have change of volume during charge and discharge of the battery, and thereby may deteriorate conductivity or may be delaminated from a negative electrode current collector. For example, when lithium ions is intercalated during the charge, the aforementioned mineral particle such as silicon or tin included in a negative active material may expand up to approximately from 300 to 400% in volume. When the lithium ions are deintercalated during the discharge, the mineral particles contract and thereby form a space departed from the active material. The space may cause an electrical insulation which severely deteriorates cycle-life of a battery.

Accordingly, Japanese Patent Laid-Open Publication No. 2005-71655 discloses a method of plating copper on a silicon surface and forming an alloy. However, the method is extremely tedious and complex and includes many processes such that the process may not be efficient in terms of economy. An amorphous alloy oxide has been suggested as a negative active material to solve the above problems (Y. Idota, et al.: Science, 276, 1395 1997). In addition, an amorphous alloy has been disclosed as a negative active material in the 43rd Battery Forum Preview Collection (Corporate Electrochemical Battery Technology Committee, Pyeung 14, October 12th, from page 308 to page 309). While silicon is known as an element that can be expected to have high capacity, however, it is difficult for silicon to exist in an amorphous form by itself alone. It is also difficult for a silicon alloy to exist in an amorphous form. According to a recently reported mechanical alloy, however, a silicon-based material may easily become amorphous. Even though the amorphous silicon alloy material has high initial cycle capacity retention compared with a crystalline alloy material, the silicon alloy material tends to have easily deteriorated capacity retention. The amorphous silicon alloy material also has a lower expansion rate and is less likely to deteriorate during charge and discharge compared to a crystalline material, since the amorphous silicon alloy material does not have a singular structure. (43rd Battery Forum Preview Collection (Corporate Electrochemical Battery Technology Committee, Pyeung 14, October 12th, from page 308 to page 309)) In addition, the amorphous silicon alloy material can be prepared to be amorphous or microcrystalline through repeated grinding and compressing and then assembly, while gradually decreasing the crystallinity of the amorphous silicon alloy material, for example, by a mechanical alloying method. However, the amorphous silicon alloy material is excessively broken at the interface among alloy structures and is broken down and pulverized due to intercalation and deintercalation of lithium ions during the charge and discharge, and thus the amorphous silicon alloy material cannot even be distinguished in an X-ray diffraction analysis, resultantly deteriorating cycle-life.

Because none of existing active materials are desirable for the formation of the lithium batteries, a novel active material having high capacity and an improved capacity retention characteristic and a lithium battery including the active material and having an improved cycle-life characteristic are required.

SUMMARY OF THE INVENTION

It is therefore one object of the present invention to provide an improved lithium battery.

It is another object to provide a better negative active material for manufacturing a lithium battery in order to overcome the deterioration in ampere-hour capacity caused by charge and discharge of the battery, and in order to improve the cycle-life characteristic of the battery.

It is another object of the present invention to provide an improved rechargeable lithium battery having high-capacity and improved cycle-life characteristics.

It is still another object to provide an improved rechargeable lithium battery inhibiting volume expansion caused by high-capacity negative active materials.

The embodiments of the present invention are not limited to the above technical purposes, and a person of ordinary skill in the art can understand other technical purposes.

According to an embodiment of the present invention, a rechargeable lithium battery includes a negative electrode including a negative active material that can form a lithium-containing compound by reversibly reacting with a lithium electrolyte including a non-aqueous organic solvent and a lithium salt, and a positive electrode including a positive active material including a compound that can reversibly intercalate and deintercalate lithium ions. The electrolyte includes an additive such as an ethylene carbonate-based compound represented by Chemical Formula 1, and a Si-included compound. The negative electrode includes a negative active material including an active element selected from the group consisting of Si, Sn, Ga, Cd, Al, Pb, Zn, Bi, In, Mg, and Ge.

[Chemical Formula 1]

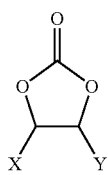

In Chemical Formula 1, X and Y are independently selected from the group consisting of hydrogen, a halogen, and a C1 to C5 fluoroalkyl. At least one of X and Y is selected from the group consisting of a halogen and a C1 to C5 fluoroalkyl.

Hereinafter, more embodiments of the present invention will be described in detail.

The rechargeable lithium battery constructed as one of embodiments of the present invention may have excellent reliability and cycle-life characteristics by inhibiting volume expansion caused by use of a high-capacity negative active material.

BRIEF DESCRIPTION OF THE DRAWING

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
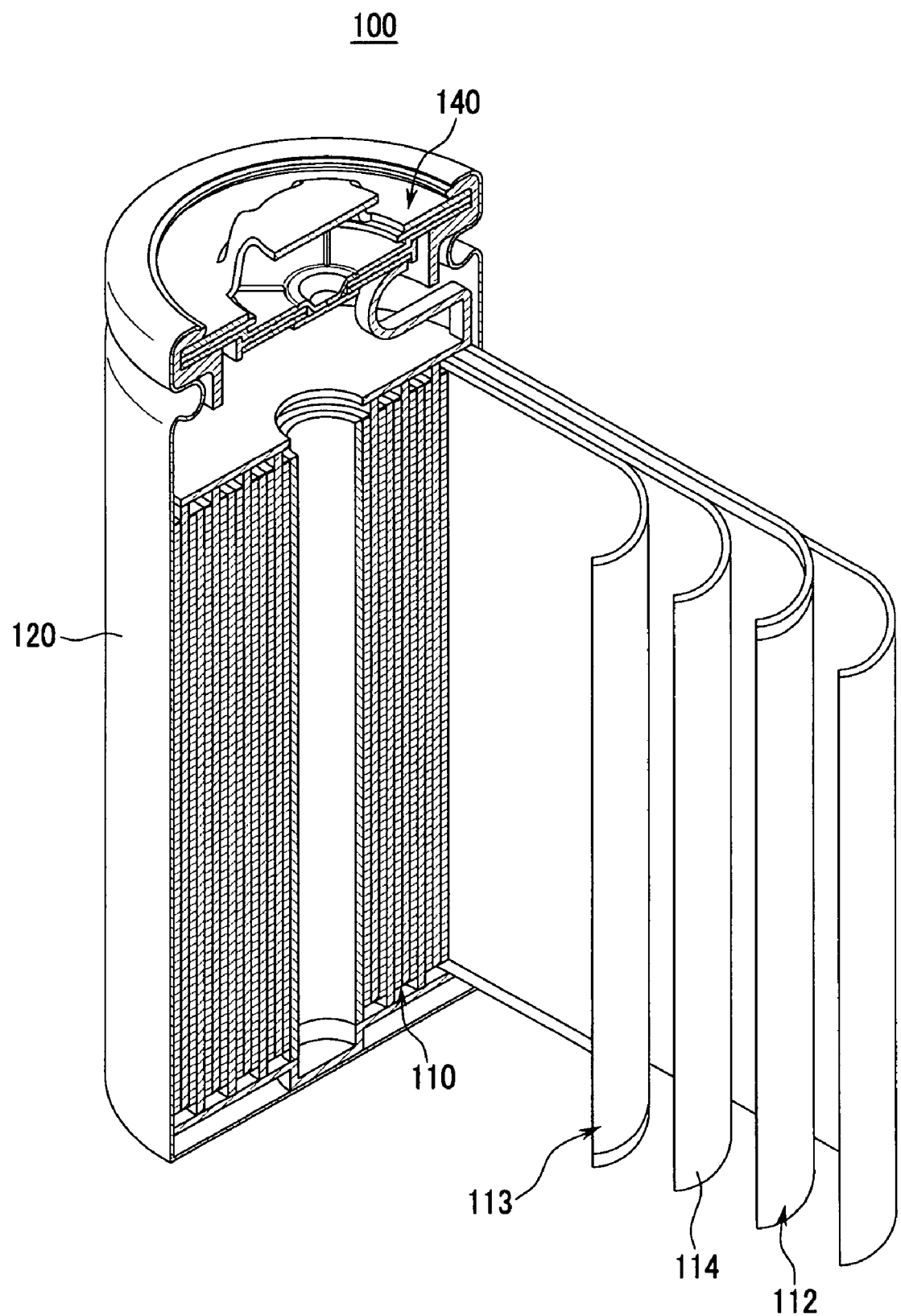
FIG. 1 is a cross-section of assembly view of a rechargeable lithium battery according to an exemplary embodiment of the present invention.
Figure 2:
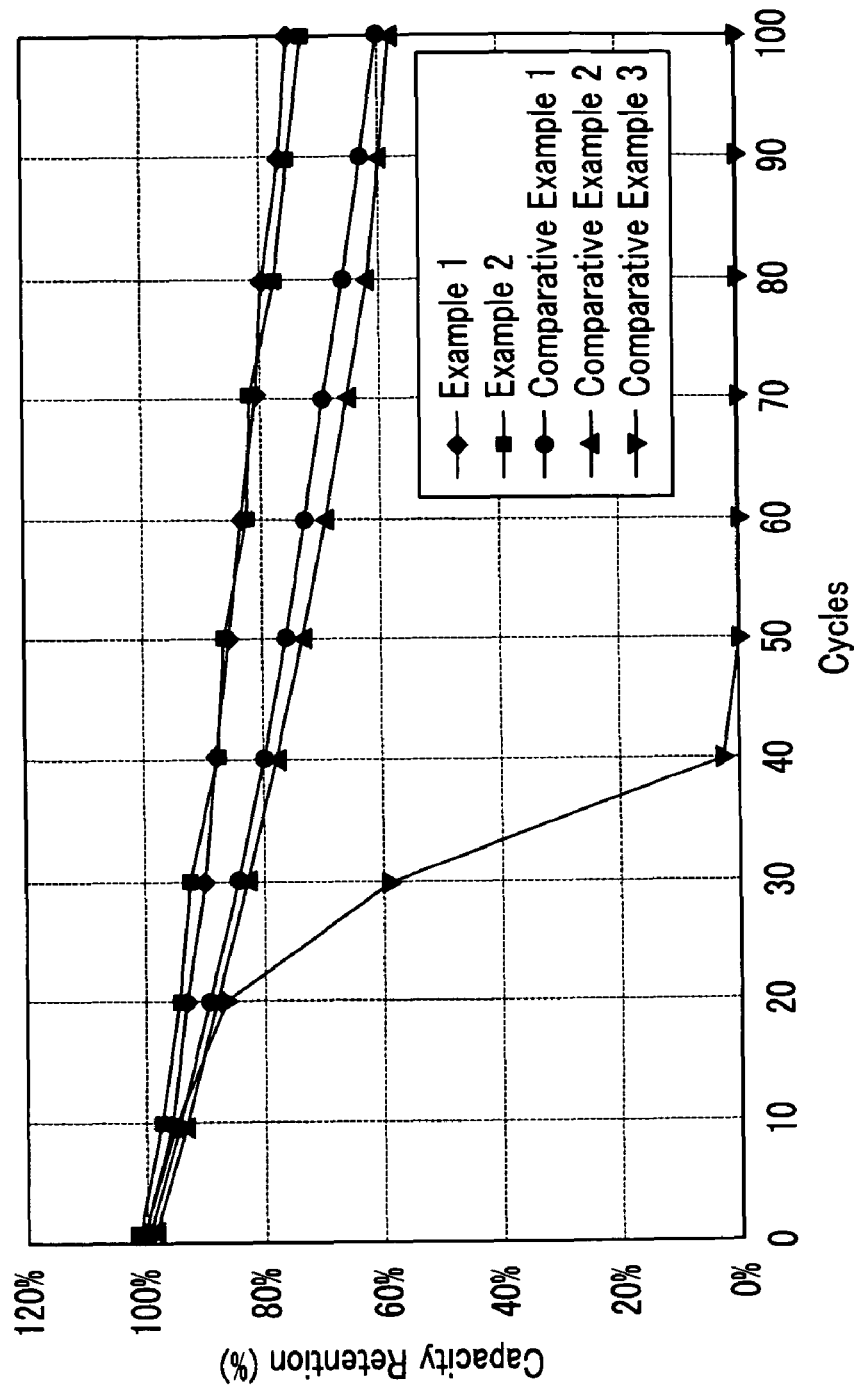
FIG. 2 is a two dimensional graph showing relationship between capacity retention of rechargeable lithium battery cells and cycles of charge and discharge, respectively according to Examples 1 and 2, and Comparative Examples 1 through 3.

Exemplary embodiments of the present invention will hereinafter be described in detail. However, these embodiments are shown by way of examples, and the present invention is not limited thereto.

Unlike a carbon electrode, when an electrode includes an active element, the active element reacts with $H_2O$, $O_2$, and the like contained in the air and thereby forms a metal oxide layer with a net structure ($MO_x$, where M is selected from the group consisting of Si, Sn, Ga, Cd, Al, Pb, Zn, Bi, In, Mg, and Ge) on the surface thereof. For example, silicon (hereinafter indicated as Si) is transformed to $SiO_x$ on the surface as shown in the following Reaction Scheme 1.

[Reaction Scheme 1]

Unlike a carbon-based electrode in which lithium ions are included, when lithium ions directly react with an active element and are alloyed into an electrode, the electrode may have a broken M-M active material network due to a Lewis acid such as $PF_5$ or HF, which is a product of decomposition of a lithium salt such as $LiPF_6$ and the like in an electrolyte, and has a non-reversible M-F combination. Since the M-F bond is generally a strong and stable combination, the M-F bond may bring a non-reversible reaction of an active material including an active element. As a result, the active element no longer works as an active material, thereby deteriorating capacity of the battery.

In addition, there is another problem of deteriorating the reversibility of charge and discharge of the battery, because of a layer including lithium alkylcarbonate and an anionic decomposed product disposed on the surface of the negative electrode.

Furthermore, the electrode has still another problem where a negative active material powder such as Si and Tin (hereinafter indicated as Sn) including an active element is alloyed with lithium during the charge of the battery and thus has an expanded volume, and is also finely-pulverized, thus promoting decomposition of the electrolyte.

Accordingly, an embodiment of the present invention suggests that an additive such as an ethylene carbonate-based compound and a Si-included compound is added to an electrolyte in a rechargeable lithium battery which includes a negative active material including an active element selected from the group consisting of Si, Sn, Ga, Cd, Al, Pb, Zn, Bi, In, Mg, and Ge.

According to one embodiment of the present invention, a rechargeable lithium battery includes a negative electrode including a negative active material that can reversibly react with a lithium electrolyte including a non-aqueous organic solvent and a lithium salt and form a lithium-containing compound, and a positive electrode including a positive active material including a compound that can reversibly intercalate and deintercalate lithium ions. The electrolyte includes an ethylene carbonate-based compound represented by the following Chemical Formula 1, and a Si-included compound as an additive. The negative electrode includes a negative active material including an active element selected from the group consisting of Si, Sn, Ga, Cd, Al, Pb, Zn, Bi, In, Mg, and Ge.

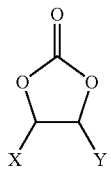

[Chemical Formula 1]

In the above Chemical Formula 1, X and Y are independently selected from the group consisting of hydrogen, a halogen, and a C1 through C5 fluoroalkyl, provided that at least one of X and Y is selected from the group consisting of a halogen and a C1 through C5 fluoroalkyl.

The ethylene carbonate-based compound forms a LiF layer on the surface of an active material including an active element by being reduced and decomposed earlier than an electrolyte which includes an organic solvent and a lithium salt, and thereby preventing non-reversible reaction of M-F and resultantly improving the cycle-life characteristic of a high-capacity rechargeable lithium battery. In addition, the produced LiF is not dissolved into an electrolyte and can maintain a stable layer and thereby suppress additional decomposition of the electrolyte during the cycles. In other words, the ethylene carbonate-based compound is added to the contemporary electrolyte which includes an organic solvent and lithium salt. The active material reacts with the ethylene carbonate-based compound prior to the reaction between the active material and the contemporary electrolyte, therefore, a layer of LiF is formed on the surface of the active material by the chemical reaction of the ethylene carbonate-based compound and the active material.

Such an ethylene carbonate-based compound includes one selected from the group consisting of fluoroethylene carbonate, fluoropropylene carbonate, chloroethylene carbonate, chloropropylene carbonate, bromoethylene carbonate, bromopropylene carbonate, and mixtures thereof. In one embodiment, one selected from the group consisting of fluoroethylene carbonate, fluoropropylene carbonate, chloropropylene carbonate, and mixtures thereof is preferable, and in another embodiment, fluoroethylene carbonate is more preferable.

In addition, the Si-included compound non-reversibly reacts with a Lewis acid such as $PF_5$ or HF contained in an electrolyte during the charge and discharge of the battery, which is a decomposed product of a lithium salt such as $LiPF_6$ and the like, and forms a fluorine-based network, so that it can prevent the negative active material from having a broken network and prevent the negative active material from reacting with the decomposed product of the lithium salt. Accordingly, the additive can improve capacity of a rechargeable lithium battery.

The Si-included compound includes the compounds represented by the following Chemical Formulae 2 through 4.

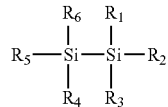

[Chemical Formula 2]

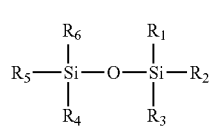

[Chemical Formula 3]

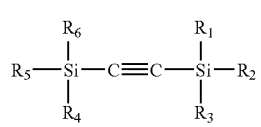

[Chemical Formula 4]

In the above Chemical Formulae 2 through 4, $R_1$ to $R_6$ may be the same or different, and are independently selected from the group consisting of hydrogen, a halogen, and a substituted or unsubstituted C1 to C10 alkyl. The term "substituted" refers to one substituted by a substituent selected from the group consisting of a halogen and a C1 through C10 alkyl.

According to one embodiment of the present invention, when a rechargeable lithium battery includes a mixed additive of an ethylene carbonate-based compound and a Si-included compound, the rechargeable lithium battery can have more stable and improved cycle characteristic than the ones including only one of the above two additives.

The sum of the ethylene carbonate-based compound and the Si-included compound is included in an amount ranging from 1 wt % to 60 wt % based on the entire weight of an electrolyte. In another embodiment, it may be included in an amount ranging from 3 wt % to 30 wt %. In still another embodiment, the ethylene carbonate-based compound is included in an amount of 5 wt % to 50 wt %, and the Si-included compound is included in an amount of 10 wt % or less based on the entire weight of an electrolyte.

In particular, when the ethylene carbonate-based compound is included in an amount of 5 wt % to 20 wt % based on the entire weight of an electrolyte, the ethylene carbonate-based compound can sufficiently form a layer on the surface of a negative electrode and improve the cycle-life characteristic of the rechargeable lithium battery depending on viscosity of the electrolyte. In addition, when the Si-included additive is included in an amount of 1 wt % to 7 wt % based on the entire weight of an electrolyte, the Si-included additive can prevent decomposition of the electrolyte according to reaction between the negative active material and electrolyte, and can improve the cycle-life characteristic of a rechargeable lithium battery in dependence upon viscosity of the electrolyte.

According to one embodiment of the present invention, a rechargeable lithium battery includes an electrolyte including a non-aqueous organic solvent, a lithium salt, and an ethylene carbonate-based compound, and a Si-included compound as an additive.

The non-aqueous organic solvent acts as a medium for transmitting ions taking part in the electrochemical reaction of the battery.

The non-aqueous organic solvent may include a carbonate-based, ester-based, ether-based, ketone-based, alcohol-based, or aprotic solvent. The carbonate-based solvent includes dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent includes methyl acetate, ethyl acetate, n-propyl acetate, dimethylacetate, methylpropionate, ethylpropionate, γ-butyrolactone, decanolide, valerolactone, mevalonolactone, caprolactone, and the like. The ether-based solvent includes dibutyl ether, tetraglyme, diglyme, dimethoxyethane, 2-methyltetrahydrofuran, tetrahydrofuran, bis(2-methoxyethylether) (DGM), tetraethylene glycol dimethylether (TetGM), triethylene glycol dimethylether (TEGDME), polyethylene glycol dimethylether (PEGDME), propylene glycol dimethylether (PGDME), dioxolan and the like. The ketone-based solvent includes cyclohexanone. Examples of the alcohol-based solvent include ethyl alcohol, isopropyl alcohol, and so on, and examples of the aprotic solvent include nitriles such as R—CN (wherein R is a C2 to C20 linear, branched, or cyclic hydrocarbon, a double bond, an aromatic ring, or an ether bond); amides such as dimethylformamide, and dimethylacetamide; dioxolanes such as 1,3-dioxolane; sulfolanes; cyclohexane and the like.

The non-aqueous organic solvent may be used singularly or in a mixture. When the organic solvent is used in a mixture, the mixture ratio may be controlled in accordance with a desirable battery performance.

The non-aqueous organic solvent may include a mixture of carbonate-based solvents and an aromatic hydrocarbon-based solvent. The carbonate-based solvent and the aromatic hydrocarbon-based solvent are preferably mixed together in a volume ratio from 1:1 to 30:1.

The aromatic hydrocarbon-based organic solvent may be represented by the following Chemical Formula 5.

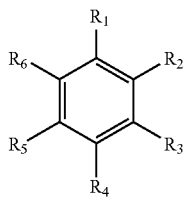

[Chemical Formula 5]

In the above Chemical Formula 5, $R_1$ through $R_6$ are independently selected from the group consisting of hydrogen, a halogen, a C1 through C10 alkyl, a C1 through C10 haloalkyl, and combinations thereof.

The aromatic hydrocarbon-based organic solvent includes one selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The lithium salt is dissolved in the non-aqueous organic solvent to supply lithium ions in the battery. It may operate a basic operation of a rechargeable lithium battery, and facilitates transmission of lithium ions between positive and negative electrodes. Non-limiting examples of the lithium salt include at least one supporting electrolyte salt selected from the group consisting of $LiPF_6$, $LiBF_4$, $LiSbF_6$, $LiAsF_6$, $LiCF_3SO_3$, $LiN(SO_2C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, lithium bisoxalate borate, and combinations thereof. The lithium salt may be used in a 0.1 M to 2.0 M concentration. This lithium salt may have a concentration ranging from 0.5 M to 1.5 M in order to improve viscosity of the electrolyte and its performance, such as ion conductivity.

According to one embodiment of the present invention, a rechargeable lithium battery includes a negative electrode including a negative active material including an active element selected from the group consisting of Si, Sn, Ga, Cd, Al, Pb, Zn, Bi, In, Mg, and Ge that can react with lithium and reversibly form a lithium-containing compound.

The negative active material including an active element selected from the group consisting of Si, Sn, Ga, Cd, Al, Pb, Zn, Bi, In, Mg, and Ge, may improve the capacity characteristic of a battery. Particularly, when the negative active material includes an active element selected from the group consisting of Si, Sn, Ga, and Cd, the negative active material may be more effective. Furthermore, when the negative active material includes an active element selected from the group consisting of Si and Sn, the negative active material may be more effective. Herein, an electrolyte constructed as the embodiments of the present invention may effectively suppress the volume expansion characteristic due to use of a high-capacity negative active material.

In addition, the negative active material may include the active element and a graphite composite-based active material. Herein, they may be mixed in a generally-used range with no particular limit. Practically, however, the active element may be included in an amount of 5 wt % to 30 wt % based on the entire weight of a negative active material. Accordingly, when a negative active material includes an active element within this range, the active element may have maximized capacity effects during the charge and discharge of the battery, and may also reduce volume expansion and contraction of the negative active material and thereby preventing its pulverization, and resultantly improves the cycle-life characteristic of a rechargeable lithium battery.

According to one embodiment of the present invention, a positive electrode may include a positive active material including a material which can form a compound that can reversibly intercalate and deintercalate lithium ions. The positive active material may include a composite oxide including at least one selected from the group consisting of cobalt, manganese, nickel, as well as lithium. Specifically, the following lithium-containing compounds may be appropriately used as the positive active material.

$Li_aAl_{1-b}B_bD_2$ (wherein $0.90 \leq a \leq 1.8$ and $0 \leq b \leq 0.5$); $Li_aE_{1-b}B_bO_{2-c}D_c$ (wherein $0.90 \leq a \leq 1.8$, $0 \leq b \leq 0.5$, and $0 \leq c \leq 0.05$); $LiE_{2-b}B_bO_{4-c}D_c$ (wherein $0 \leq b \leq 0.5$ and $0 \leq c \leq 0.05$); $Li_aNi_{1-b-c}Co_bB_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_a$ $NiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the above formulae, A is selected from the group consisting of Ni, Co, Mn, and combinations thereof; B is selected from the group consisting of Al, Ni, Co, Mn, Cr, Fe, Mg, Sr, V, a rare earth element, and combinations thereof; D is selected from the group consisting of O, F, S, P, and combinations thereof; E is selected from the group consisting of Co, Mn, and combinations thereof; F is selected from the group consisting of F, S, P, and combinations thereof; G is selected from the group consisting of Al, Cr, Mn, Fe, Mg, La, Ce, Sr, V, and combinations thereof; Q is selected from the group consisting of Ti, Mo, Mn, and combinations thereof; I is selected from the group consisting of Cr, V, Fe, Sc, Y, and combinations thereof; and J is selected from the group consisting of V, Cr, Mn, Co, Ni, Cu, and combinations thereof.

The lithium-containing compound can have a coating layer on the surface of the lithium-containing compound itself, or can be mixed with a compound having a coating layer. The coating layer may include at least one coating element compound selected from the group consisting of an oxide of a coating element, a hydroxide, an oxyhydroxide of a coating element, an oxycarbonate of a coating element, and a hydroxyl carbonate of a coating element. The compounds for a coating layer may be amorphous or crystalline. The coating element for a coating layer may include Magnesium, Aluminum, Cobalt, Potassium, Sodium, Calcium, Silicon, Titanium, Vanadium, Tin, Germanium, Gallium, Boron, Arsenic, Zirconium, or mixtures thereof. Here, Mg refers to Magnesium; Al refers to Aluminum, Co refers to Cobalt; K refers to Potassium; Na refers to Sodium; Ca refers to Calcium; Si refers to Silicon; Ti refers to Titanium; V refers to Vanadium; Sn refers to Tin; Ge refers to Germanium; Ga refers to Gallium; B refers to Boron; As refers to Arsenic; and Zr refers to Zirconium. The coating layer may be formed by a method having no negative influence on properties of the positive active material by including these elements in the compound. For example, the method may include any coating method such as spray coating, dipping, and the like. Description of these methods will not be illustrated in more detail, because they are all well-known to those skilled in the art.

In addition, a rechargeable lithium battery of the present invention may include a member other than a positive electrode, a negative electrode, and an electrolyte, for example a separator separating the positive electrode and the negative electrode. The separator, as an example, may include a microporous film made of a polyolefin resin such as polypropylene, polyethylene, or the like.

According to one embodiment of the present invention, a rechargeable lithium battery includes an ethylene carbonate-based compound layer on the surface of a negative electrode. The electrolyte is suppressed from decomposition of an electrolyte because of a Si-included compound included in the electrolyte. In addition, the Si-included compound may suppress the volume expansion characteristic of a high-capacity negative active material, and thus accomplish excellent reliability and cycle-life characteristics.

The following examples illustrate the present invention in more detail. However, it is understood that the present invention is not limited by these examples.

A person having ordinary skills in the art can sufficiently understand parts of the present invention that are not specifically described.

EXAMPLES 1 THROUGH 4 AND
COMPARATIVE EXAMPLES 1 THROUGH 4

An electrolyte was prepared to have a composition according to the following Table 1. Referring to Table 1, an ethylene carbonate-based compound and a Si-included compound were added to a non-aqueous electrolyte by a unit of wt %, a non-aqueous organic solvent was composed by a unit of volume %, and a lithium salt was included by a unit of mol/L based on the entire amount of the electrolyte. In addition, FEC indicates monofluoroethylene carbonate, EC indicates ethylene carbonate, and DEC indicates diethylcarbonate in Table 1.

TABLE 1

|  | Non-aqueous Solvent (Vol %) | | Electrolytic salt (M) | FEC (wt %) | Si-included additive (wt %) |
|---|---|---|---|---|---|
| Example 1 | EC (20) | DEC (80) | $LiPF_6$ (1.3) | 10 | Hexamethyl disilane (5) |
| Example 2 | EC (20) | DEC (80) | $LiPF_6$ (1.3) | 10 | Hexamethyl disiloxane (5) |
| Example 3 | EC (20) | DEC (80) | $LiPF_6$ (1.3) | 10 | Bis(trimethylsilyl) acetylene (5) |
| Example 4 | EC (20) | DEC (80) | $LiPF_6$ (1.3) | 20 | Bis(trimethylsilyl) acetylene (10) |
| Comparative Example 1 | EC (20) | DEC (80) | $LiPF_6$ (1.3) | 0 | Hexamethyl disilane (5) |
| Comparative Example 2 | EC (20) | DEC (80) | $LiPF_6$ (1.3) | 0 | Hexamethyl disiloxane (5) |
| Comparative Example 3 | EC (20) | DEC (80) | $LiPF_6$ (1.3) | 0 | 0 |
| Comparative Example 4 | EC (20) | DEC (80) | $LiPF_6$ (1.3) | 10 | 0 |

Next, a positive electrode slurry was prepared by mixing a lithium cobalt oxide ($LiCoO_2$) positive active material, carbon black as a conductive material, and polyvinylidene fluoride as a binder in a weight ratio of 92:4:4 and dispersing the mixture into an N-methyl-2-pyrrolidone solvent. The positive electrode slurry was coated on a 20 µm-thick aluminum film by a doctor blade method, dried at 120° C. for 24 hours under a vacuum atmosphere to volatilize the N-methyl-2-pyrrolidone, and compressed, preparing a positive electrode.

On the other hand, a negative electrode slurry was prepared by mixing a Si/graphite composite (Si: graphite=15:85 in weight ratio) as a negative active material, styrene-butadiene rubber as a binder, and carboxylmethyl cellulose as a viscosity agent in a weight ratio of 96:2:2, and then dispersing the mixture in water. This negative electrode slurry was coated on a 15 µm-thick copper film by a doctor blade method and dried at 120° C. for 24 hours under a vacuum atmosphere to volatilize the N-methyl-2-pyrrolidone, preparing a negative electrode.

Next, a 20 µm-thick polyethylene film separator was inserted between the positive and negative electrodes. The resulting product was spiral-wound and compressed, and then inserted in a 5 mm-thick, 34 mm-wide, and 50 mm-high can. Then, the electrolytes constructed as Example 1 through 4 and Comparative Example 1 through 4 were respectively inserted into each of the prepared prismatic cans to fabricate a rechargeable lithium battery cell in general methods known in the art.

FIG. 1 is an exemplary embodiment of a rechargeable lithium battery according to the present invention. The rechargeable lithium battery 100 comprises a negative electrode 112, a positive electrode 113, a separator 114 interposed between the electrodes 112 and 113, an electrolyte impregnated in the negative electrode 112 and the positive electrode 113, a container 120, and a sealing member 140 sealing the container 120. FIG. 1 illustrates a battery 100 of cylindrical shape, but the battery may be another type of battery including, for example, a prismatic battery or a pouch type battery.

Standard Capacity Experiment

The rechargeable lithium battery cells according to Examples 1 through 4 and Comparative Examples 1 through 4 were charged with a current of 700 mA up to a voltage of 4.3 V and discharged at 700 mA down to a voltage of 2.5 V, and then measured regarding capacity. The measurement results are provided in the following Table 2.

Cell Thickness Evaluation

The rechargeable lithium battery cells according to Examples 1 to 4 and Comparative Examples 1 to 4 were charged with a current of 700 mA up to a voltage of 4.3 V, and then measured regarding thickness at their thickest part. The measurement results are shown in the following Table 2.

Cycle-Life Experiment

The rechargeable lithium battery cells according to Examples 1 to 4 and Comparative Examples 1 to 4 were repeatedly charged 100 times with a current of 1400 mA up to a voltage of 4.3 V and discharged at 1400 mA down to a voltage of 2.5 V. The capacity retention results up to 100 cycles are shown in the following Table 2. In particular, FIG. 1 shows capacity retention results of the rechargeable lithium battery cells according to Examples 1 and 2 and Comparative Examples 1 through 3. Herein, the capacity retention after 100 charges and discharges indicates a ratio of discharge capacity at the $100^{th}$ charge and discharge against that of the first charge and discharge.

TABLE 2

|  | Standard Capacity (mAh) | Thickness after standard charging (mm) | $100^{th}$ capacity retention (%) |
|---|---|---|---|
| Example 1 | 1396 | 5.65 | 74.9 |
| Example 2 | 1395 | 5.66 | 73.5 |
| Example 3 | 1398 | 5.68 | 74.7 |
| Example 4 | 1392 | 5.62 | 75.3 |
| Comparative Example 1 | 1395 | 5.72 | 60.5 |
| Comparative Example 2 | 1393 | 5.75 | 58.9 |
| Comparative Example 3 | 1382 | 6.02 | 0 |
| Comparative Example 4 | 1390 | 5.82 | 62 |

As shown in FIG. 1 and Table 2, the rechargeable lithium battery cells of Examples 1 through 4 and Comparative Examples 1 through 4 had similar capacity retention up to 20 cycles. However, the rechargeable lithium battery cell of Comparative Examples had deteriorated capacity retention after 20 cycles. In particular, the rechargeable lithium battery cell of Comparative Example 3 had sharply deteriorated capacity retention down to 80% or less from 30 cycles as shown in FIG. 1. On the other hand, the rechargeable lithium battery cells of Examples 1 through 4 including two additives such as fluoroethylene carbonate and Si-included compounds have an excellent cycle-life characteristic compared with those including at most one additive according to Comparative Examples 1 through 4.

As shown in Table 2, the rechargeable lithium battery cells including fluoroethylene carbonate and Si-included compounds according to Examples 1 through 4 had excellent standard capacity and excellent capacity retention compared with those including at most one additive according to Comparative Examples 1 through 4.

In addition, after standard-charging, they were less thick than the rechargeable lithium battery cells including no additive or only one additive of fluoroethylene carbonate and a Si-included compound according to Comparative Examples 1 through 4. Accordingly, the volume expansion characteristic of the rechargeable lithium battery cells constructed as the embodiments of the present invention was suppressed.

While this invention has been described in connection with what is presently considered to be practical exemplary embodiments, it is understood that the present invention is not limited to the disclosed embodiments, on the contrary, is intended to cover various modifications and equivalent arrangements included within the spirit and scope of the appended claims.

What is claimed is:

1. A rechargeable lithium battery, comprising:
   a negative electrode comprising a negative active material which comprises an active element selected from the group consisting of Si, Sn, Ga, Cd, Al, Pb, Zn, Bi, In, Mg, and Ge;
   a lithium electrolyte comprising a non-aqueous organic solvent, a lithium salt, and an additive;
   a positive electrode comprising a positive active material comprising a component that can reversibly intercalating and deintercalating lithium ions; and wherein
   the negative electrode reacting with the lithium electrolyte, and reversibly forming a lithium-included compound; and
   the additive comprises an ethylene carbonate-based compound represented by Chemical Formula 1 and a silicon-included compound represented by Chemical Formulae 2 and 4, chemical Formula 1

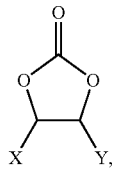

wherein X and Y are each independently substituents selected from the group consisting of hydrogen, a halogen group, and a fluoroalkyl group with 1 through 5 carbons, X and Y are not hydrogen at the same time, and at least one of X and Y is selected from the group consisting of a halogen group and a fluoroalkyl with 1 through 5 carbons; and Chemical Formula 2

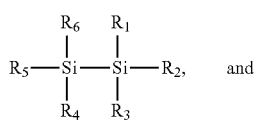

and

Chemical Formula 4

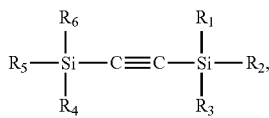

wherein $R_1$ through $R_6$ are either the same or different, and are independently selected from the group consisting of hydrogen, a halogen group, and a substituted or unsubstituted alkyl group with 1 through 10 carbons.

2. The rechargeable lithium battery of claim 1, wherein the ethylene carbonate-based compound is selected from the group consisting of fluoroethylene carbonate, fluoropropylene carbonate, fluorogammabutyrolactone, chloroethylene carbonate, chloropropylene carbonate, chlorogammabutyrolactone, bromoethylene carbonate, bromopropylene carbonate, bromogammabutyrolactone, and mixtures thereof.

3. The rechargeable lithium battery of claim 1, wherein the amount of the additive is comprised of 1 wt % to 60 wt % based upon the entire weight of the lithium electrolyte.

4. The rechargeable lithium battery of claim 1, wherein the lithium electrolyte comprises 5wt % to 50 wt % of the ethylene carbonate-based compound and 10 wt % or less of the silicon-included compound based upon the entire weight of the lithium electrolyte.

5. The rechargeable lithium battery of claim 1, wherein the non-aqueous organic solvent comprises at least one compound selected from the group consisting of an ether-based solvent, carbonate-based solvent, ester-based solvent, ketone-based solvent, alcohol-based solvent, and an aprotic organic solvent, and combinations thereof.

6. The rechargeable lithium battery of claim 1, wherein the lithium salt is at least one compound selected from the group consisting of $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and lithium bisoxalate borate, and combinations thereof.

7. The rechargeable lithium battery of claim 1, wherein the lithium salt is used in a concentration ranging from 0.1 mol/L to 2.0 mol/L.

8. The rechargeable lithium battery of claim 1, wherein the negative active material comprises one of active elements of Si and Sn.

9. The rechargeable lithium battery of claim 1, wherein the negative active material is a composite active material of an active element and graphite.

10. The rechargeable lithium battery of claim 1, wherein the active element of the negative active material is comprised in an amount of 5 wt % to 30 wt % based on the entire weight of the negative active material.

11. The rechargeable lithium battery of claim 1, wherein the positive electrode comprises, as a positive active material, a lithium compound selected from the group consisting of $Li_aA_{1-b}B_bD_2$ (wherein $0.90 \leq a \leq 1.8$ and $0 \leq b \leq 0.5$); $Li_aE_{1-b}B_bD_c$ (wherein $0.90 \leq a \leq 1.8$, $0 \leq b \leq 0.5$, and $0 \leq c \leq 0.05$); $LiE_{2-b}B_bO_{4-c}D_c$ (wherein $0 \leq b \leq 0.5$ and $0 \leq c \leq 0.05$); $Li_aNi_{1-b-c}Co_bB_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$, where, in the above formulae, A is selected from the group consisting of Ni, Co, Mn, and combinations thereof; B is selected from the group consisting of Al, Ni, Co, Mn, Cr, Fe, Mg, Sr, V, a rare earth element, and combinations thereof; D is selected from the group consisting of O, F, S, P, and combinations thereof; E is selected from the group consisting of Co, Mn, and combinations thereof; F is selected from the group consisting of F, S, P, and combinations thereof; G is selected from the group consisting of Al, Cr, Mn, Fe, Mg, La, Ce, Sr, V, and combinations thereof; Q is selected from the group consisting of Ti, Mo, Mn and combinations thereof; I is selected from the group consisting of Cr, V, Fe, Sc, Y, and combinations thereof; and J is selected from the group consisting of V, Cr, Mn, Co, Ni, Cu, and combinations thereof.

* * * * *